United States Patent Office 3,464,478
Patented Sept. 2, 1969

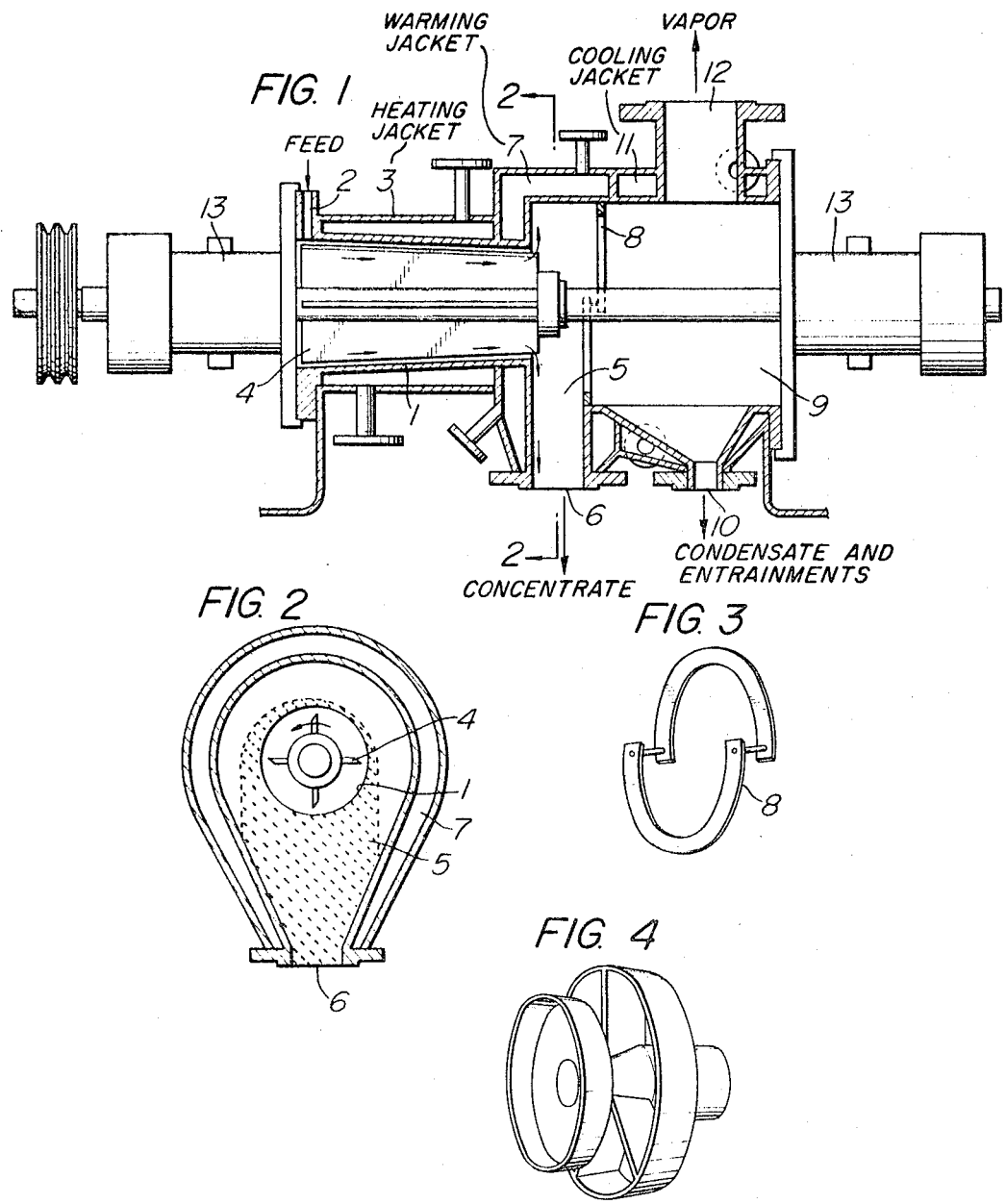

3,464,478
HORIZONTAL-TYPE HIGH VACUUM FILM EVAPORATOR FOR HIGHLY VISCOUS SOLUTIONS
Tomoharu Ueda, Nishinomiya-shi, Shinichiro Terao, Ashiya-shi, and Seizo Yabuta, Oita-shi, Japan, assignors to Sumitomo Chemical Company, Ltd., Osaka, Japan, a corporation of Japan
Filed July 3, 1967, Ser. No. 650,886
Claims priority, application Japan, July 5, 1966, 41/43,980
Int. Cl. B01d 1/22
U.S. Cl. 159—6      4 Claims

ABSTRACT OF THE DISCLOSURE

A horizontal-type centrifugal film evaporator adapted for processing highly viscous solutions and for high vacuum evaporation, in which the direction of flow of a highly viscous concentrate producd in an evaporation section is changed in a concentrate discharge section so as to prevent said concentrate from flowing into a vapor discharge section and thereby to discharge said concentrate from said concentrate discharge section, and the inner wall of said vapor discharge section is cooled to reduce the velocity of the vapor, providing for collection of that part of concentrate having been entrained into the vapor and also for condensation of the vapor on the cooled surface of said wall with no pressure loss.

---

The present invention relates to a horizontal-type centrifugal film evaporator adapted to be used for processing highly viscous solutions and for high vacuum evaporation.

The horizontal-type centrifugal film evaporator is advantageous over the vertical-type in that a product of higher concentration can be obtained. However, conventional parallel-flow-type horizontal centrifugal film evaporators, when used for industrial applications, have the serious drawback that, where the viscosity of a concentrate is high, the concentrate flows into a vapor discharge section under pressure, without being completely discharged from a concentrate discharge port, and attached to the inner wall surface of the vapor discharge section. As a result, the vapor discharge port is finally clogged by said concentrate, making it impossible to continue the operation. Such difficulty is encountered especially when the viscosity of the concentrate is higher than 100 to 300 poises.

On the other hand, conventional counter-flow-type horizontal centrifugal film evaporators are not usable industrially for the processing of highly viscous solutions, because a substantial amount of the solution being processed is carried into the vapor discharge section due to the pressure distribution on the solution film in the evaporator, where the solution has a high viscosity, and in the case, for example, of a concentrate having a viscosity of 100 to 300 poises, on the order of 30% of the solution supplied is entrained into the vapor.

The object of the present invention, therefore, is to provide a horizontal-type film evaporator of the construction as will be described later, which is particularly adapted for the processing of highly viscous solutions and which eliminates the aforementioned drawbacks of the conventional apparatus.

According to an aspect of the present invention, owing to the structure of the concentrate discharge section to be described later, the flow direction of the concentrate is changed in the concentrate discharge section so as to prevent said concentrate from flowing into the vapor discharge section and thereby to discharge said concentrate from said concentrate discharge section. According to another aspect of the present invention, the vapor discharge section is enlarged with respect to the evaporation section and the inner wall thereof is cooled, whereby the velocity of the vapor is reduced in said section to provide for the collection of that part of the concentrate having been entrained into vapor and at the same time the vapor is condensed on said cooled inner wall surface without substantial pressure loss.

Such condensing effect in the vapor discharge section enables the area of the condenser used to be substantially reduced and therefore enables the pressure loss in the condenser to be minimized, which pressure loss has been a bottleneck in high vacuum evaporation operation.

By employing the evaporator according to the present invention, it is possible to carry out high vacuum processing of solutions at an absolute degree of vacuum of 1 mm. Hg or below, the requirement for which has been increasing recently in the chemical as well as the foodstuff industry.

In order that the present invention may be more clearly understood and readily put into effect, reference will now be had to the accompanying drawings, in which the present invention is illustrated by way of example and in which:

FIG. 1 is a vertical cross section of a film evaporator embodying the present invention;

FIG. 2 is a cross section taken on the line 2—2 of FIG. 1;

FIG. 3 is a perspective view of a substantially annular interference member; and FIG. 4 is a substantially disc-shaped mist separator.

Referring to the drawings and particularly to FIG. 1, an evaporator drum 1 of the horizontal film evaporator is provided with a material inlet port 2 and is surrounded by a heating jacket 3. In the drum 1 is a rotary shaft having radial vanes 4 fixedly mounted thereon. The rear ends of the radial vanes 4 are arranged in parallel to the inner wall of the drum 1 with a slight interval therebetween. A concentrate discharge section 5 is provided adjacent to the forward end of the drum 1 in communication therewith and is provided at its lower portion with a concentrate discharge port 6. The concentrate discharge section 5 is surrounded by a warming jacket 7. Provided successively to and in communication with the concentrate discharge section 5 is a vapor discharge section 9 which is provided at its upper portion with a vapor discharge port 12 and at its lower portion with a condensate discharge port 10. The vapor discharge section 9 is surrounded by a cooling jacket 11. These jackets 3, 7 and 11 are provided independently of each other and each has a suitable heating or cooling medium being circulated therein at a suitable temperature. Reference numeral 8 designates a substantially annular interference member as best shown in FIG 3, and 13 designates a shaft sealing unit.

In operating the evaporator of the construction described above, a feed material solution is charged through the material inlet port 2 into the evaporator drum 1, wherein it is formed into a film on the inner wall surface of said drum, upon being stirred by the vanes 4 rotating at high speed, and is caused to move towards the concentrate discharge section 5 while being evaporated.

Now, as described previously, the first characteristic feature of the inventive apparatus resides in the construction of the concentrate discharge section 5. Namely, as can be seen from FIG. 1, the concentrate discharge section 5 has an inner diameter greater than that of the drum 1 and further, as shown in FIG. 2, the lower portion of said section is downwardly converged as far as the concentrate discharge port 6 at a certain angle. The forward ends of the rotor vanes 4 are slightly extended into the concentrate discharge section 5. Such being the arrangement, the highly viscous concentrate moving axially forwardly on the wall of the drum 1, when reaching the concentrate discharge section 5 which is enlarged with respect to the drum 1, flows in a vertical direction as indicated by the arrows in FIG. 1 along the inner wall of said section, due to the centrifugal force developed therein under the action of the rotor vanes 4. The highly viscous concentrate thus flowing radially of the rotary shaft is progressively decreased in its speed due to the viscous frictional resistance between it and the wall of the concentrate discharge section, and to its own weight, and the component of the speed in a direction radially of the rotary shaft is decreased to zero before said concentrate reaches the peripheral end wall of the section parallel to the rotary shaft. As a result, the highly viscous concentrate begins to flow downwardly along the wall under gravity and is discharged to the outside through the concentrate discharge port 6 at the lower portion of said section. Namely, the effect of wet surface caused by the concentrate on the wall is restricted only to the area in the vicinity and lower portion of the rotary shaft, as indicated by the dotted lines in FIG. 2, that is to say that the concentrate does not flow to the peripheral end wall of said section extending parallel to the rotary shaft. Thus, the intrusion of the concentrate into the vapor discharge section can be prevented.

The second characteristic feature of the inventive evaporator lies in the construction of the vapor discharge section 9. Namely, the mist or entrainments of the concentrate emergent from the drum 1 drops downwardly in the enlarged concentrate discharge section 5 and vapor discharge section 9 under the effect of gravity, as the velocity of the vapor is decreased sharply.

On the other hand, the vapor is condensed on the cooled wall surface of the vapor discharge section 9, dissolving the mist which has been deposited onto said wall surface. Thus, the attachment of concentrate on the inner wall of the vapor discharge section can be avoided. The substantially annular interference member 8 is provided for the purpose of avoiding the condensate being mixed in the concentrate. Where it is desired to collect the mist at the concentrate discharge section 5, the substantially disc-shaped mist separator as shown in FIG. 4 may be fixedly mounted on the rotary shaft on the material feeding side with respect to the interference member 8. The amount of condensate may be varied in a wide range by adjusting the temperature of the cooling medium being circulated in the jacket 11. Because of the condensation in the vapor discharge section 9, the load exerted on the condenser used can be mitigated markedly and accordingly the pressure loss in said condenser can be minimized.

Now, the present invention will be illustrated in further detail by way of a practical example thereof.

EXAMPLE

The evaporator used in this example had a heating surface area of 0.1 m.², the inner diameter of the drum 1 being 155 mm. at the material inlet side and 130 mm. at the concentrate discharge section side, the length of the drum being 265 mm., the lengths of those end portions of the rotor vanes 4 projecting into the concentrate discharge section 5 being 20 mm., the inner diameter of the concentrate discharge section being 250 mm., the diameter of the concentrate discharge port 6 being 70 mm., the diameter of the vapor discharge port 12 being 100 mm., and the diameter of the condensate discharge port 10 being 40 mm.

Using this apparatus, a material solution having a specific gravity of 1.1 to 1.3 and a viscosity of 1 to 10 poises, and containing 70 to 80% of evaporable substance, was charged into the apparatus at the rate of 10 to 20 kg./hr., while maintaining the temperature of the drum heating jacket 3 at 200 to 270° C., the temperature of the concentrate discharge section warming jacket 7 at 150 to 200° C., the temperature of the vapor discharge section cooling jacket 11 at 30 to 100° C., and the degree of vacuum in the apparatus at 0.3 to 1.0 mm. Hg. The operation was continued for 100 hours. A concentrate containing 1 to 5% of evaporable substance and having a viscosity of 100 to 500 poises was obtained very smoothly. During the operation, the ratio of condensate in the vapour discharge section to that in the condenser varied within the range from 1 to 10 upon adjustment of the vapor discharge section cooling jacket temperature.

What is claimed is:

1. A horizontal-type centrifugal wiped film evaporator comprising an evaporator drum having a material inlet port provided at its top portion at one end and surrounded by a heating jacket; a concentrate discharge section provided with a coaxial warming jacket and connected at one end to the other forward discharge end of said evaporator drum in axial communication therewith; a coaxial vapour discharge section having a vapor discharge port at its upper portion and a condensate discharge port at its lower portion, surrounded by a cooling jacket and connected to the other end of said concentrate discharge section in axial communication therewith; and a rotary shaft extending through said exaporator drum, concentrate discharge section and vapor discharge section, and having an axis containing radial vanes coextensive with and fixedly mounted on that portion of said shaft which is located in said evaporator drum for rotation therein, in which both said concentrate discharge section and said vapor discharge section are diametrically enlarged with respect to the evaporator drum, between said concentrate discharge section and said vapor discharge section there being provided a transverse annular partition member extending radially inward from the interior wall, and the temperature of said cooling jacket is so controlled as to condense part or all of the vapor introduced into said vapor discharge section.

2. The invention as recited in claim 1 and further comprising means to assist in the collection of mist at the concentrate discharge section.

3. The invention of claim 2 wherein said assist means comprises a substantially disc-shaped mist separator.

4. The invention of claim 3 wherein said mist separator is fixedly mounted on said rotary shaft.

References Cited

UNITED STATES PATENTS

| | | | |
|---|---|---|---|
| 1,420,648 | 6/1922 | Mabee. | |
| 1,732,805 | 10/1929 | D'Yarmett | 196—128 |
| 2,812,019 | 11/1957 | Rasmussen | 159—49 |
| 2,927,634 | 3/1960 | Gudheim. | |
| 2,933,526 | 4/1960 | Guyer et al. | 260—555 |
| 3,349,828 | 10/1967 | Monty. | |
| 3,346,034 | 10/1967 | Donovan et al. | |

NORMAN YUDKOFF, Primary Examiner

J. SOFER, Assistant Examiner

U.S. Cl. X.R.

202—236; 159—13